(12) United States Patent
Shepard et al.

(10) Patent No.: US 6,973,508 B2
(45) Date of Patent: Dec. 6, 2005

(54) HIGHLY VERSATILE PROCESS CONTROL SYSTEM CONTROLLER

(75) Inventors: Rusty Shepard, Austin, TX (US); Ken Krivoshein, Elgin, TX (US); Dan Christensen, Austin, TX (US); Gary Law, Georgetown, TX (US); Kent Burr, Round Rock, TX (US); Mark Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 289 days.

(21) Appl. No.: 10/074,304

(22) Filed: Feb. 12, 2002

(65) Prior Publication Data

US 2003/0153988 A1  Aug. 14, 2003

(51) Int. Cl.$^7$ ............................................. G06F 13/00
(52) U.S. Cl. .............................. 710/8; 710/104; 700/2; 700/8; 712/10
(58) Field of Search ............................... 710/1–4, 105, 710/8–14, 20–21, 62–63, 72, 104; 705/12, 705/56; 79/209; 713/100; 700/2–12, 20; 709/208, 220; 712/1–15

(56) References Cited

U.S. PATENT DOCUMENTS

| | | | |
|---|---|---|---|
| 4,149,237 A | | 4/1979 | Freitas |
| 4,152,760 A | | 5/1979 | Freitas et al. |
| 4,349,870 A | * | 9/1982 | Shaw et al. ............... 712/38 |
| 4,517,637 A | | 5/1985 | Cassell |
| 4,539,655 A | | 9/1985 | Trussell et al. |
| 4,542,452 A | * | 9/1985 | Fukai et al. ............... 700/12 |
| 4,949,299 A | | 8/1990 | Pickett |
| 5,072,374 A | * | 12/1991 | Sexton et al. ............. 709/208 |
| 5,237,652 A | * | 8/1993 | McManus ............... 715/839 |
| 5,373,231 A | | 12/1994 | Boll et al. |
| 5,374,231 A | | 12/1994 | Obrist |
| 5,379,382 A | * | 1/1995 | Work et al. ............... 710/63 |

(Continued)

FOREIGN PATENT DOCUMENTS

EP  491657  6/1992

(Continued)

OTHER PUBLICATIONS

International Search Report for PCT/FI 01/00639 dated Oct. 16, 2001.

(Continued)

*Primary Examiner*—Christopher Shin
(74) *Attorney, Agent, or Firm*—Marshall, Gerstein & Borun LLP (57) ABSTRACT

A versatile controller that can be used as either a stand-alone controller in a relatively small process plant or as one of numerous controllers in a distributed process control system depending on the needs of the process plant includes a processor adapted to be programmed to execute one or more programming routines and a memory, such as a non-volatile memory, coupled to the processor and adapted to store the one or more programming routines to be executed on the processor. The versatile controller also includes a plurality of field device input/output ports communicatively connected to the processor, a configuration communication port connected to the processor and to the memory to enable the controller to be configured with the programming routines and a second communication port which enables a user interface to be intermittently connected to the controller to view information stored within the controller memory. When used in a distributed process control system, the controller platform may be used as a remote input/output device and the ports of this remote input/output device may be logically mapped to controllers within the distributed process control system in a manner that is different than the physical connection between such controllers and the remote input/output device.

47 Claims, 3 Drawing Sheets

U.S. PATENT DOCUMENTS

| | | | | |
|---|---|---|---|---|
| 5,410,730 | A | * | 4/1995 | Longsdorf et al. ............. 710/4 |
| 5,481,481 | A | | 1/1996 | Frey et al. |
| 5,644,487 | A | * | 7/1997 | Duff et al. .................... 700/56 |
| 5,682,476 | A | | 10/1997 | Tapperson et al. |
| 5,793,963 | A | | 8/1998 | Tapperson et al. |
| 5,801,940 | A | | 9/1998 | Russ et al. |
| 5,887,165 | A | * | 3/1999 | Martel et al. ............... 713/100 |
| 5,960,214 | A | | 9/1999 | Sharpe, Jr. et al. ......... 395/835 |
| 5,963,444 | A | * | 10/1999 | Shidara et al. ................. 700/7 |
| 5,978,593 | A | * | 11/1999 | Sexton .......................... 710/1 |
| 6,014,612 | A | | 1/2000 | Larson et al. |
| 6,078,320 | A | | 6/2000 | Dove et al. ................. 345/333 |
| 6,105,093 | A | * | 8/2000 | Rosner et al. .............. 710/105 |
| 6,192,281 | B1 | | 2/2001 | Brown et al. .................. 700/2 |
| 6,236,334 | B1 | | 5/2001 | Tapperson et al. |
| 6,298,376 | B1 | * | 10/2001 | Rosner et al. .............. 709/209 |
| 6,298,454 | B1 | | 10/2001 | Schleiss et al. ............... 714/37 |
| 6,898,703 | B1 | * | 5/2005 | Ogami et al. .................. 713/2 |
| 2002/0070753 | A1 | * | 6/2002 | Vogel et al. .................. 326/37 |
| 2002/0101451 | A1 | * | 8/2002 | Duemler ..................... 345/764 |

FOREIGN PATENT DOCUMENTS

| | | |
|---|---|---|
| EP | 0 540 903 A1 | 5/1993 |
| EP | 0 890 906 A2 | 1/1999 |
| EP | 0 923 010 A2 | 6/1999 |
| EP | 940738 | 9/1999 |
| EP | 788627 | 12/1999 |
| EP | 1 041 476 A2 | 10/2000 |
| GB | 283836 | 5/1995 |
| GB | 2 355 545 A | 4/2001 |
| GB | 2 363 477 A | 12/2001 |
| WO | WO 96/12993 | 5/1996 |
| WO | WO 00/33049 | 6/2000 |
| WO | WO 02/02199 | 1/2002 |

OTHER PUBLICATIONS

International Search Report for PCT/US 95/13150 dated Mar. 18, 1996.

* cited by examiner

HIGHLY VERSATILE PROCESS CONTROL SYSTEM CONTROLLER

TECHNICAL FIELD

This patent relates generally to process control systems and, more particularly, to a versatile controller adapted for various uses in process control systems of various sizes.

DESCRIPTION OF THE RELATED ART

Process plants, like chemical production plants, petroleum refinery plants and other manufacturing plants, typically include numerous process control devices such as valves and switches and numerous transmitters/sensors, such as pressure and temperature sensors, (generally called "field devices") interconnected with one or more process controllers. The process controllers receive signals from the sensors and implement some control logic, such as a proportional, integral, derivative (PID) control routine, to produce control signals which, in turn, are sent to the process control devices to maintain the process in a desired state or to drive the process to a predetermined operating point.

In the past, the process controllers used in process plants have taken on numerous forms. The simplest and possibly most prevalent type of process controller is a programmable logic controller (PLC). A PLC is a simple and relatively inexpensive logic unit, typically having hardwired circuitry or an electronically programmable memory, such as an EPROM or EEPROM, that stores highly particularized control logic to be implemented on basic logic elements such as AND and OR gates. Generally, each PLC within a process plant is connected directly to multiple field devices and, typically, implements a control routine or program using certain specialized logic programming paradigms used in the process control industry, such as sequential flow logic, ladder logic, functional flow chart logic, etc. While PLCs are fairly low cost in nature, they have significant drawbacks in use. In particular, they are generally difficult to program, as they require someone who is very familiar with the specialized logic programming being used, and each PLC must generally be programmed individually, usually by someone going out to each PLC device within the plant and connecting a hand-held or portable unit to the device to program the PLC device. Further, it is hard to develop an integrated process control system, i.e., one that is assessable and changeable from a centralized location, using PLCs as it is difficult to interface with numerous PLCs in any coordinated manner or to have PLCs communicate with one another. Thus, while PLCs are useful in controlling a small number of field devices at a single location, the use of PLCs in larger plants or in plants having many devices becomes cumbersome and unwieldy from an organizational and documentation standpoint.

To overcome the problems associated with PLCs, some process control designers have, in the past, used a centralized controller architecture to provide centralized process control. In these systems, a very powerful, centralized computer or controller is connected via specialized input/output devices to all of the field devices within the process plant. The centralized controller implements numerous control routines to provide process control throughout the entire plant. While very capable, these centralized control systems are very expensive, require a lot of cabling and, generally, are hard to program and reprogram because the programs are typically proprietary in nature. Because of the expense, it is generally only practical to use these high power, centralized controllers in very large process plants having many many field devices.

Another common control system architecture currently in use in many process plants is known as a distributed process control system. In this architecture, numerous process controllers, each with the size and complexity of a standard personal computer, are distributed at various locations throughout a process plant, with each controller being responsible for an area or other logical section of the plant. In some cases, such as with the DeltaV® process control system sold by Fisher-Rosemount Systems Inc., the distributed controllers are interconnected with each other and with one or more operator interfaces, data historians, and other support devices. In the DeltaV distributed process control system, applications executed on the operator workstations are used to reprogram the controllers, to view the state of the process as reported by the controllers, to analyze the process plant or the process control system using data provided by the controllers, etc. Because the distributed controllers are based on and use a common or general purpose microprocessor architecture, they are more easily programed than PLCs and can use higher level programming structures or languages, such as object oriented programming languages which, generally speaking, are more easily interfaced with and used by applications executing in an operator interface. For example, in the DeltaV process control system, an object oriented programming paradigm is used to advantageously organize and track the different process control devices and controllers and the logic running on those devices. This object oriented programming structure is also used by the applications executing on an operator interface to enable organization, viewing and changing of the process control routines being implemented within the controllers.

The use of distributed process control systems provides the computing and organizational power associated with a centralized computer at a much lower cost and, incidentally, provides a scalable process control system, i.e., one that can be expanded over time by simply adding additional controllers and field devices. The use of distributed process control system technology has therefore provided better control and control functionality in medium and large process plants. None-the-less, there are numerous smaller plants, such as small manufacturing plants having only dozens of field devices, where it is not economically feasible to implement a full scale distributed process control system when first installing a controller, but in which it may be necessary to upgrade to incorporate such a distributed process control system at some time in the future such as when, for example, future expansion occurs. Currently, these plants are limited to using PLC devices until the plant actually becomes large enough to make the purchase of a full scale distributed process control system economically feasible. However, because PLC devices and the controllers used in distributed process control systems are vastly different in design and use, it is impossible or unfeasible to use PLC devices within a distributed process control system. As a result, the initial investment in the PLC devices and the engineering and programming activities in setting up the PLC system must be completely discarded to implement the distributed process control system, which is wasteful in terms of plant resources. Thus, when changing over to a distributed process control system architecture, the small plant can not use much, if any, of the existing control structure implemented in the PLC devices.

SUMMARY

A versatile controller is disclosed herein which can be used as either a stand-alone controller in a relatively small process plant or as one of numerous controllers or remote input/output devices in a distributed process control system depending on the needs of the process plant. In the first case, the controller provides a stand-alone platform that can implement advanced control logic, such as that associated with a distributed process control system controller, to control a limited number of field devices. This stand-alone controller is an economical alternative to the use of a PLC. However, the controller can, at any time, be easily connected to one or more other controllers and operator interfaces to form a distributed process control system. The disclosed controller is inexpensive and easy to implement as a stand-alone controller in, for example, a very small process plant but can, at a later date, be communicatively connected to other controllers to form a distributed process control system when, for example, the process plant is increased in size to the point that the use of the distributed process control system architecture makes economical sense.

In one embodiment, the versatile controller includes a processor adapted to be programmed to execute one or more programming routines, a memory, such as a non-volatile memory, coupled to the processor and adapted to store the one or more programming routines to be executed on the processor, a plurality of field device input/output ports communicatively connected to the processor and a configuration communication port connected to the processor and to the memory.

The versatile controller may also include a second communication port, such as a MODBUS TCP port or any serial port, such as an RS-485 port, adapted to be intermittently connected to a user interface to enable the user interface to view information stored within the memory or the processor. A register map may be stored in the memory and may be adapted to be accessed by the second communication port to allow access to information within the controller. If desired, the plurality of programming routines may be compatible with a distributed process control system programming paradigm, such as an object oriented programming paradigm, which makes this control programming useable when the stand-alone controller is upgraded to be part of a distributed process control system.

DESCRIPTION

Figure 1:
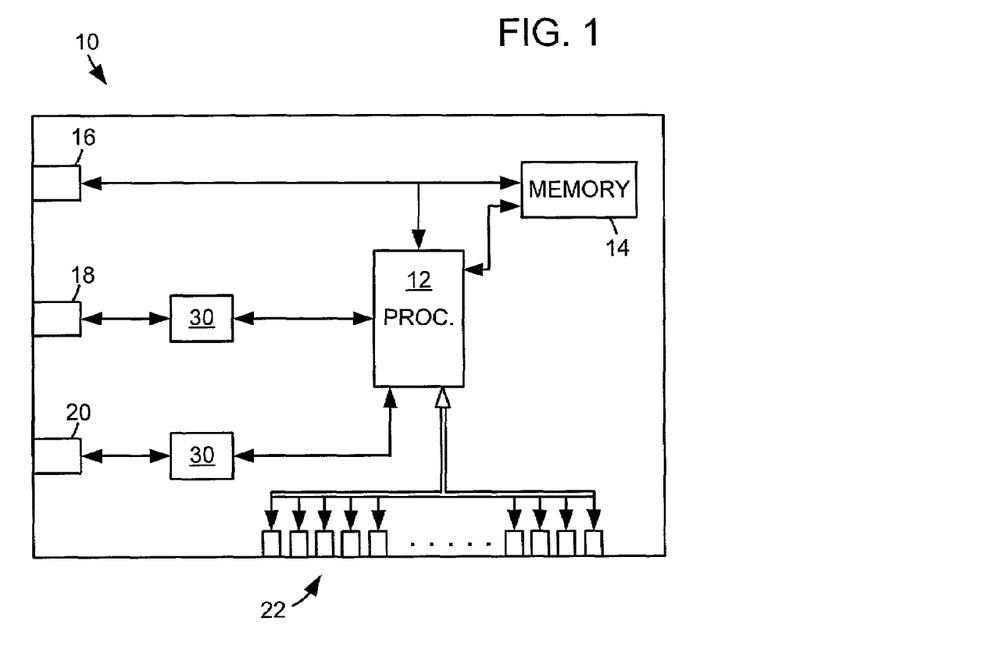
FIG. 1 is a block diagram of an exemplary versatile controller capable of operating as a stand-alone controller as well as being configured to operate within a distributed process control system.

Referring now to FIG. 1, a versatile process control system controller 10 is illustrated as including a processor 12, a memory 14, three general purpose communication ports 16, 18 and 20 and multiple field device input/output ports 22. The processor 12 may be any type of processor but, preferably, is a general purpose, programable processor such as those generally used in personal computers, distributed processor control system controllers and the like. The processor 12 does not, however, need to be as powerful as the processors typically used in distributed process control system controllers which thereby reduces the cost associated with the controller 10 as compared to a distributed control system controller. If desired, the processor 12 could alternatively be any type of hardwired processor, ASIC or other type of reprogrammable processor. Preferably, the processor 12 is powerful enough to implement or execute applications or programs that are written using higher level programming languages or paradigms, such as object oriented programming paradigms.

The memory 14 can be any desired type of memory and preferably includes a least a portion thereof that is persistent or non-volatile in nature, such as EPROM, EEPROM, etc. The memory 14 stores programming routines for use in controlling one or more field devices connected to the controller 10 via the input/output ports 22. In the embodiment illustrated in FIG. 1, the controller 10 includes 24 discrete field device input ports, two or more of which can be pulse count inputs and 16 discrete field device output ports, each of which can be directly connected to individual field devices. However, any other desired number or types of input/output ports 22 can be used instead. Furthermore, the field device input/output ports 22 may be implemented as wireless ports. In this case, a transmitter/receiver is located in the controller 10 connected to the processor 12 and provides different channels, such as time or frequency channels, for each of the different field devices coupled thereto wirelessly. Of course, such wireless communication components are known and will not be described in more detail herein.

The embodiment of the controller 10 illustrated in FIG. 1, includes three bus ports 16, 18 and 20 for use in connecting the controller 10 at various times and in various uses to a configuration device, a user interface, additional controllers, input/output devices or other devices. In one embodiment, the communication port 16 is an ethernet communication port and may be reserved for a configuration workstation that can be connected directly or indirectly to the configuration port 16 to be used to configure the controller 10, i.e., to download configuration programming to the memory 14 of the controller 10. Preferably, the IP address of the port 16 is a fixed address. The second port 18 is preferably a MODBUS TCP communications port adapted to be configured to be in a master or slave mode. The IP address of the communications port 18 is preferably set by a user or system configurator using, for example, a configuration workstation attached to the first communication port 16. The third communication port 20 is preferably a serial port, such as an RS-485 port. Two or more controllers 10 may be connected together via the MODBUS TCP port 18 or the RS-485 port 20. Similarly, an operator interface may be connected to the controller 10 via the RS-485 port to view the current state of the controller 10 or to reset certain parameters or registers within the controller 10. Of course, the ports 16, 18 and 20 could be any other desired types of communication ports and additional or fewer communication ports can be used.

The communication ports 18 and 20 may use one or more register maps 30, such as illustrated in FIG. 1, to provide access to the controller programming and variable information. In one example, a resister map 30 (which is actually stored in the memory 14) includes any number of variables or registers that are to be made available or accessible via the communication ports 18 and 20. In a particular configuration, each register map 30 used for slave mode communications includes 16-bit holding registers and 32-bit holding registers. There may be, for example, two hundred 16-bit registers and one hundred 32-bit registers within the register map 30, although more or less registers or registers of other sizes and types may be used as well. During operation, the register map 30 makes registers used by the programming stored on the memory 14 available for input/output purposes via the communication ports 18 and 20. Thus, the registers within the register map 30 may store variables which are changed by a user or other device via one of the communication ports 18 or 20 to alter operation of the programming stored on the memory 14 or may store variables that are used by the programming on the memory 14 but which are needed to be viewed or accessed by a user or other device via one of the communication ports 18 and 20.

Preferably, the programming stored on the memory 14 and implemented or executed by the processor 12 is written or designed using a higher level programming paradigm, such as an object oriented programming language. Most preferably, this programming is designed to conform with the programming structure and protocols used by a particular distributed process control system to which the controller 10 can be upgraded at a later date. In one example, the controller 10 may be programmed to execute objects in an object oriented programming structure which are completely or at least highly compatible with the object oriented programming language of a known distributed process control system, such as the DeltaV process control system sold by Fisher-Rosemount Systems, Inc., headquartered in Austin, Tex. In this case, the programming paradigm is also compatible or based on the FOUNDATION Fieldbus protocol programming paradigm. Of course, the programming used in the controller 10 could be compatible with any other distributed process control system and need not be an object oriented process control type of system. Still further the programming routines may be communication routines, control routines, etc. Preferably, the memory 14 is adapted to store and the processor 12 is adapted to execute control routines of any complexity, such as typical PID control routines, or advanced routines, such as fuzzy logic or neural network, adaptive tuning or model predictive control routines and optimization routines, to name but a few. Furthermore, the controller 10 may store and execute other advanced routines, such as advanced diagnostic routines, alarming routines, etc. which are typically associated with distributed process control systems.

During operation, the controller 10 can be used in a number of different ways and a number of different configurations which makes the controller 10 very versatile and upgradable as the control system in which the controller 10 is located, grows. In particular, the controller 10 can be used as a stand-alone controller in a very small process control system to control various field devices directly via the input/output ports 22. In this case, the controller 10 functions very similar to the way in which a PLC device is typically used in small process control systems. However, because the controller 10 has an easily programmable processor and is programmed using a language and protocol compatible with a particular distributed process control system, the controller 10 can be easily combined with other controllers using the particular distributed process controller protocol and structure to implement a full scale distributed process control system. In this case, the controller 10 can still operate the same programming routines stored in its memory to control the same devices, and yet be integrated as part of a distributed process control system when, for example, the plant within which the controller 10 is located is expanded to include more devices and functions than can be handled by the controller 10 alone. Still further, the controller 10 can be used as an input/output device associated with a distributed process control system controller in a case in which the controller 10 needs to integrated into a system already having distributed process control system controllers or one needing higher power controllers.

Figure 2:
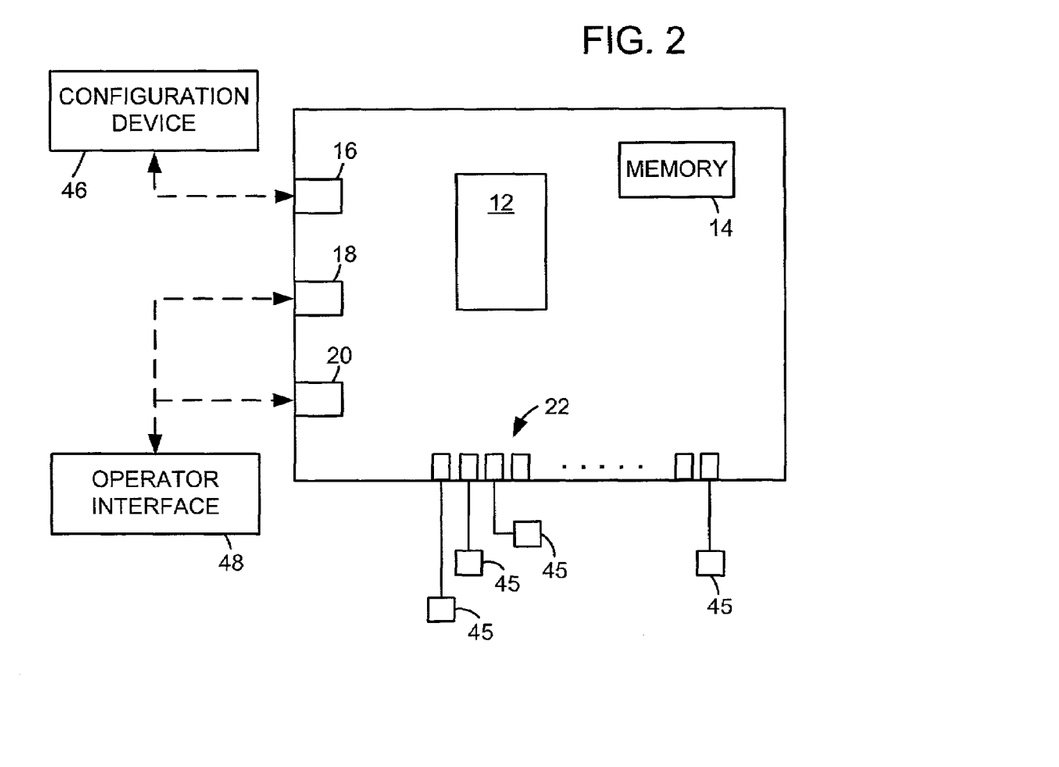
FIG. 2 is a block diagram of the controller of FIG. 1 removably connected to a user interface and to a configuration device.

FIG. 2 illustrates a process control system 40 in which the controller 10 is used as a stand-alone controller. As illustrated in FIG. 2, the controller 10 is connected via various ones of the field device input/output ports 22 to individual field devices 45 within the process plant. Of course, one or more of these connections may be wireless. The field devices 45 can be any desired types of field devices, such as sensors, transmitters, valves, switches, etc. In this configuration, a user initially connects a configuration device 46, such as a hand-held data assistant, a laptop computer or other configuration interface to the configuration port 16. Thereafter, using any known configuration application, such as one associated with a distributed process control system to which the controller 10 can be later upgraded, the user programs the controller 10 to execute one or more control programming routines of any desired nature using the field devices 45. Preferably, the controller 10 stores its own configuration in the non-volatile portion of the memory 14 so that, if the controller 10 loses power or experiences some other interruption, the configuration for the controller 10 is not lost.

The user may program or configure the controller 10 by designing, creating and downloading a set of control applications or modules to the memory 14 and instructing the processor 12 to begin executing one or more of these control programs. As noted above, these control programs are preferably designed by a configuration application used in a particular distributed process control system such as the DeltaV process control system, so that the control applications are compatible and usable within such a process control system environment, should the controller 10 ever be scaled up to be part of such a process control system.

In any event, after downloading a configuration via the port 16, the configuration interface 46 is disconnected and the controller 10 begins to operate to control the process using the control routines stored therein. If the user desires to access information pertaining to the controller, the user can connect a portable operator interface device 48 to one of the ports 18 and 20 to access the registers within the register map 30. Further, the controller can be reconfigured if the user reconnects the configuration device 46 to the communication port 16. The use of the MODBUS TCP interface port 18 provides for a host of available user interfaces and applications which use this paradigm and which can, therefore, easily access the controller 10.

Figure 3:
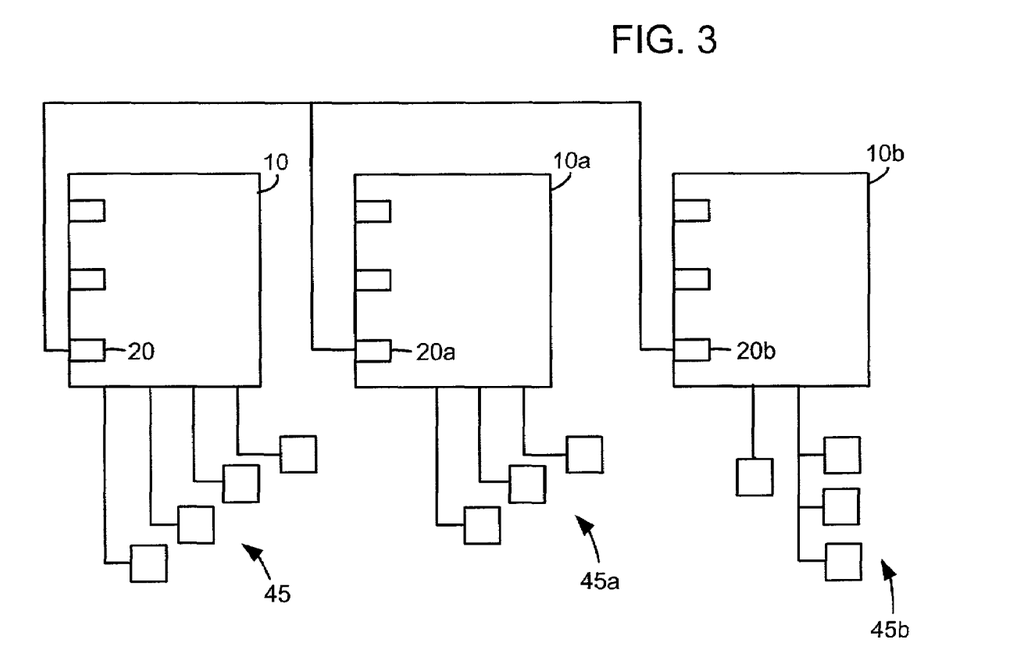
FIG. 3 is a block diagram of the controller of FIG. 1 operating as a stand-alone controller interconnected with multiple input/output devices.

If desired, the controller 10 can be connected to other controllers of the same design via one of the communication ports 18 or 20 to expand the capability of the process control system without migrating to a full fledged distributed process control system. In particular, as illustrated in FIG. 3, a second controller 10*a* may be connected to the serial port 20 of the controller 10 while a third controller 10*b* may be connected to the serial port 20a of the controller 10a. In this configuration, the controllers 10, 10a and 10b may operate together as separate controllers in the same process control system.

If desired however, the stand-alone controller 10 may be used with one or more field device expansion devices which operate as input/output devices for the controller 10. In this case, referring again to FIG. 3, the devices 10a and 10b are not controllers but are multiplexing devices which connect the controller 10 through the port 20 to other field devices 45a and 45b. Here, the devices 10a and 10b are programmed or configured to operate as multiplexing devices for the field devices 45a and 45b connected to the input/output ports 22a and 22b of the devices 10a and 10b. The devices 10a and 10b then send signals to and receive signals from the controller 10, via the ports 20a and 20b, which signals are to be communicated to or from the field devices 45a and 45b. If desired, the expansion devices 10a and 10b may be wireless input/output devices, can be programmed to be compatible with any desired or known field device communication protocol, such as the Fieldbus protocol, the HART protocol, etc., and may use any desired type of multiplexing routine, such as any typically associated with known input/output devices. As will be understood, the configuration of FIG. 3 expands the input/output capabilities of the controller 10 using the same platform, which reduces the complexity of an expanded system.

It will be noted that, because the processor 12 of the controller 10 is directly connected to each of the input/output ports 22, the processor has very direct (and therefore fast) as well as synchronous control over these ports and, thus, can communicate with the field devices connected to the ports 22 at any desired time. In fact, due to the direct connection, there is no need for a multiplexer or bus communication system within the controller 10 (although the processor 12 may include a switching network), which is different than typical distributed process control system controllers. Because of this feature, the controller 10 can provide fast acting synchronous control, such as on the order of 5 millisecond control.

Of course, in the system illustrated in FIG. 3 in which the devices 10a and 10b are input/output devices, the controller 10 still has direct control over each of the field devices to which it is connected and can perform synchronous, i.e., time synchronized functions with respect to the field devices connected through the expansion devices 10a and 10b, which is desirable in a process control system and is typically necessary in distributed process control systems.

Figure 4:
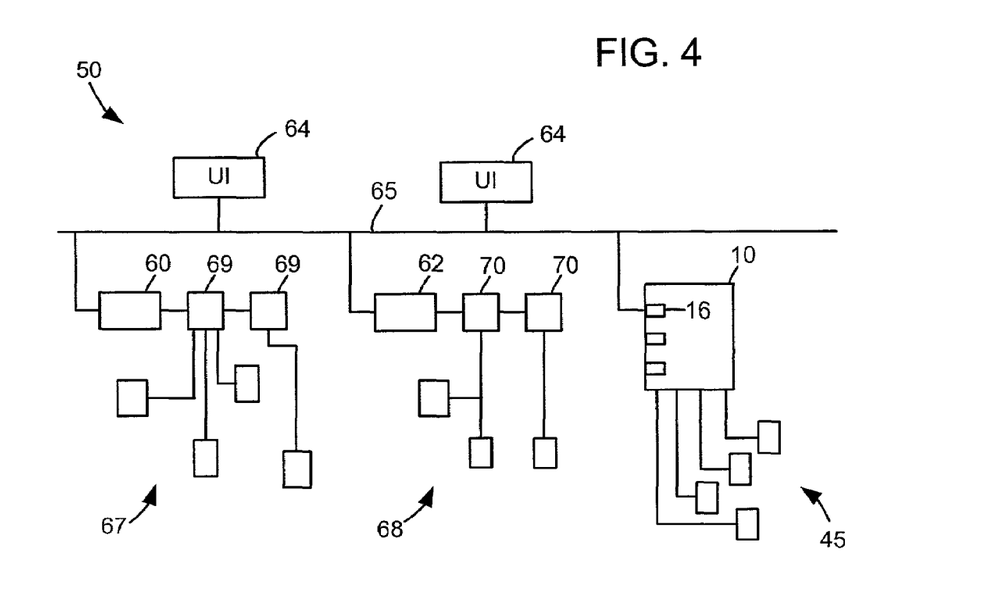
FIG. 4 is a block diagram of the controller of FIG. 1 interconnected as one of a plurality of controllers within a distributed process control system.

Referring now to FIG. 4, the control system of FIG. 2 can be easily upgraded to become part of a distributed process control system generally depicted in FIG. 4. In the embodiment of FIG. 4, the controller 10 is illustrated as being connected within a distributed process control system 50 having two other controllers 60 and 62 and one or more user interfaces 64. The user interfaces 64 and the controllers 10, 60 and 62 are connected by a bus 65, such as an ethernet bus, to provide for continuous communications therebetween. Of course, each of the other controllers 60 and 62 is connected to other field devices, generally indicated as 67 and 68, via one or more typical or known local input/output devices 69 and 70. Notably, the controller 10 is connected in the same manner to the field devices 45 as it was in the stand-alone configuration of FIG. 2. Here, however, the controller 10 is connected to the bus 65 via the configuration communication port 16, which enables applications executed on the user interfaces 64 to configure the controller 10 at any desired time.

When the distributed process control system of FIG. 4 uses the particular programming paradigm and protocols used to configure the controller 10 in the stand-alone configuration, the controller 10 can execute the same control routines as in the configuration of FIG. 2, except that the controller 10 can now communicate status, alarms and other information to the user interfaces 64 and the other controllers 60 and 62 via the ethernet connection 65. In this manner, the process control system of FIG. 2 can be expanded, upgraded or migrated to the process control system 50 of FIG. 4 with minimal hardware and/or software changes to the controller 10. As a result, it is easy and less expensive to use the controller 10 of FIG. 2 until the plant grows in size to accommodate the distributed system of FIG. 4. At that time, the hardware and most of the software purchased or created for the system of FIG. 2 car, be used in and converted to be used in a full scale distributed process control system such as that illustrated in FIG. 4. Reconfiguration time is also reduced this way. This versatility enables the use of the controller 10 both as an initial stand-alone system and as part of a larger, distributed process control system.

Of course, at the time of the migration, the configuration applications within the distributed process control system, such as one located or implemented by one of the user interfaces 64 can automatically sense (autosense) the presence of the controller 10 and the devices attached thereto (providing the distributed process control system is capable of performing autosensing functions) and can upload the configuration of the controller 10 into a centralized configuration database associated with the entire process control system 50. Such a configuration database can be stored in, for example, one of the user interfaces 64 or in a dedicated database attached to, for example, the ethernet bus 65. Furthermore, the controller 10, which is connected to the distributed process control system 50 via the configuration port 16, can be configured by a configuration application within the user interface 64 at any time. In this manner, the controller 10 now functions similar to the other controllers 60 and 62 which are standard controllers within the distributed process control system 50.

Because of the versatility of the controller 10, in some cases, the controller 10 can be used as an input/output device, such as a remote input/output device, in a full scale distributed process control system instead of or in addition to being used as a controller in such a system. Thus, if the process control system becomes large enough, it may be desirable to simply use the controller 10 as a remote input/output device for one or more of the controllers within the distributed process control system. In this case, even when the processor or and communication needs of the distributed process control system outstrip that of the controller 10, the controller 10 can still be advantageously used within the process control system as an input/output device, which reduces the cost of upgrading to the larger system as well as uses the hardware already purchased for the plant before the expansion took place. FIG. 4 also illustrates the use of the controller 10 as a remote input/output device in a distributed process control system 50. However, the remote input/output device 10 is connected to the ethernet bus 65 in the same manner as if the controller 10 were being used as a separate controller. Of course, the device 10 could be connected in the process control system 50 in any manner that any other remote I/O device can be connected in that system, such as through one of the input/output devices associated with one of the controllers 60 or 62. In the case in which the controller 10 is used as a remote input/output device, the processor of the controller 10 is configured or programmed to operate as an input/output device for the field devices 45 connected thereto.

The versatility of the controller 10 enables a plant control designer to start very small, i.e., with only a single controller, but to easily upgrade as needed without having to initially purchase hardware (such as a PLC) that is not compatible with or useable within the larger distributed process control system. Furthermore, the use of the controller 10, which is compatible with a specific distributed process control system, allows an upgrade to occur with only a minimal amount of reprogramming and reconfiguration activities. The versatile controller 10 reduces or eliminates the ad hoc growth and documentation complexity typically associated with a process control system that use PLCs added over time and also reduces or eliminates the need to discard hardware (and software) when upgrading to a distributed process control system.

Still further, because the controller 10 implements the same programming paradigm as the other controllers within the distributed process control system (such as the control system 50 of FIG. 4), it can be integrated into the configuration of that system in the same manner as the other controllers 60 and 62. Thus, in the case in which a configuration viewing application is provided in the distributed process control system 50, such as one executed on one of the user interfaces 64, the controller 10 can be listed or viewed in the same manner as the controllers 60 and 62.

Still further, it is possible, when using the controller platform 10 as a remote I/O device, to logically connect the field devices 45 associated with the controller 10 (now used as an I/O device) within the process control system 50 with any of the other controllers 60 and 62 within the system 50. In fact, any of the I/O ports of a remote I/O device 10 may be mapped to any other controller within the process control system 50. In particular, the controller 10, when used as a remote input/output device, can be configured within the process control system 50 to be logically connected to (or to appear as directly connected to) any of the other actual controllers within the system 50 or to have any of its ports logically mapped to any of the actual controllers within the system 50 even though the remote I/O device is not directly physically connected to the field device input/output port of that controller. For example, in the system of FIG. 4, some of the input/output ports of the controller 10 (being used as a remote input/output device) may be logically connected to the controller 60 and, in this case, the device 10 will send all of its information from these ports, such as communications from the field devices 45, to the controller 60 for further processing and can receive information to be delivered to any of the field devices 45 on these ports from the controller 60. Of course, the ports of the remote input/output device 10 may be coupled to further input/output devices connected to one or more field devices. In this case, it appears to the controller 60 that the input/output devices connected to the designated ports of the remote input/output device 10 are connected in the same manner as one of the input/output devices 69, even though the information from the remote input/output device 10 is coming via the ethernet bus 65. This logical connection enables the remote input/output device 10 to send its data (such as data from multiple field devices 45 associated with an input/output device connected at one of its ports) and enables the controller 60 to send data to the field devices 45 via this port over the ethernet bus 65 more efficiently than if that data was sent individually (packet by packet) in an individually addressed type communication protocol. Here, because the remote device 10 knows it needs to send all of its data from a particular data port to the controller 60, the remote device 10 can send multiple data packets from the same or different field devices 45 associated with that port in a single larger packet. The controller 60 can do the same when sending data to the remote I/O device 10 for delivery to different field devices 45 associated with a common port. This structure enables more efficient use of the bandwidth on the ethernet bus 65 than sending each data packet separately, which is typically done today in controller to controller type of communications.

Figure 5:
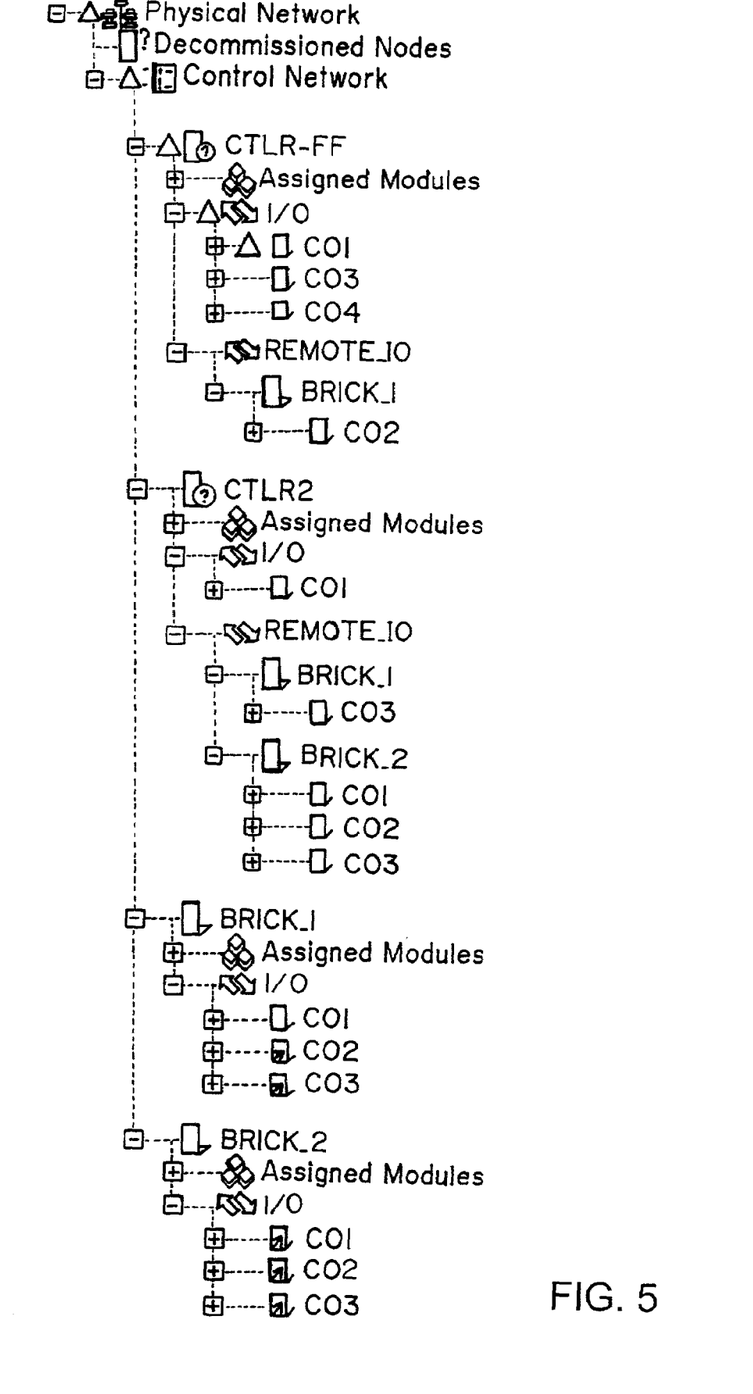
FIG. 5 is a configuration display generated by a configuration application illustrating the versatile controller platform configured as remote input/output devices in a distributed process control system and to be logically mapped to any controller within the process control system.

FIG. 5 illustrates a configuration display, generated by a configuration application, depicting the configuration of a distributed process control system having two controllers CTLR-FF and CTRL2 and having two of the versatile controller platforms 10 (BRICK_1 and BRICK_2) operating as remote input/output devices. As illustrated in the display of FIG. 5, the controllers CTLR-FF and CTLR2 and the remote input/output devices BRICK_1 and BRICK_2 have assigned modules (i.e., programming routines or modules implemented therein) and one or more input/output devices or cards connected directly thereto. Input/output devices or cards such as C01, C02 and C04 are associated physically and logically with the controller CTLR-FF while a card C01 is associated both physically and logically with the controller CTLR2. Still further, each of the remote input/output devices BRICK_1 and BRICK_2 have ports or cards C01, C02 and C03 both physically and logically associated therewith.

However, in the configuration depicted in FIG. 5, the C02 port of the BRICK_1 device (and thus the input/output device or card connected to the C02 port) is logically (but not directly physically) connected to or associated with the controller CTLR-FF, as illustrated under the REMOTE_IO icon under the CTLR-FF designation in the display. Likewise, the C03 port of the BRICK_1 device is logically (but not directly physically) connected as a remote input/output port to the controller CTLR2. This logical connection (which is different than the physical connection) is illustrated in the display of FIG. 5 by the arrow in the icon of the C02 and C03 cards underneath the I/O section of the BRICK_1 icon. Similarly, the C01, C02 and C03 ports of the BRICK_2 device (and thus the input/output devices connected to these ports) are logically connected to or associated with the controller CTLR2, as illustrated under the REMOTE_IO information under the CTLR2 designation in the display. Still further, the C01 card or port of the BRICK_1 device is used for local control by the BRICK_1 device which is, in this context, operating as a controller within the process control network.

It should be noted that, in the process control system being depicted by the configuration display of FIG. 5, the controllers CTLR-FF and CTLR2 and the remote input/output devices BRICK_1 and BRICK_2 are all connected directly to the ethernet bus of the process control system, such as illustrated in FIG. 4 for the controllers 60 and 62 and the device 10. Of course, the remote input/output devices can be connected in any desired manner to the process control system and still have one or more ports thereof logically connected to or associated with any of the controllers in the system, even though there is no direct physical connection between the typical input/output ports of the controllers and the remote input/output devices. When performing this logical connection, the controllers and the remote input/output devices must be configured to provide the necessary communications over the necessary connections, such as over the ethernet bus 65 of FIG. 4. In one case, each of the controllers and the remote input/output devices can have communication modules stored therein which collect data to be sent between the devices within a time period and which send that data all at once as part of a larger and more efficient data package, which thereby decreases communication overhead on the ethernet bus or other connection between the devices.

It will be understood that the remote input/output devices BRICK_1 and BRICK_2 can be manipulated and reprogrammed using the configuration display of FIG. 5 in the same manner as the controllers CTLR-FF and CTLR2 because, in this environment, the remote input/output devices BRICK_1 and BRICK_2 are executing in the same type of programming paradigm, using compatible programming structures and communication protocols as the other devices. As a result, the ports of the remote input/output devices BRICK_1 and BRICK_2 can be logically connected to any desired controllers or other devices and these connections may be specified in any desired manner. For example, the C02 port of the BRICK_1 device of FIG. 5 maybe logically associated with the controller CTLR-FF by dragging the C02 port of the BRICK_1 device up to and underneath of the CTLR_FF REMOTE_IO icon and dropping it there as a remote IO device. This may cause configuration software to then create and download the necessary communication modules within the controller CTLR-FF and the input/output device BRICK_1 to perform the communication associated with this logical connection. Such general communication software is known in the art and will not be described in more detail herein. Of course, any other method of specifying and performing logical connections between remote input/output devices and controllers (or other devices) can be used as well.

Still further, while the logical connection between a remote input/output device and a controller within a distributed process control system has been described herein using the versatile controller platform described above, it will be understood that this same process of logically associating ports of or an entire remote input/output device with a controller that is different than the physical connection within the system can with used with other types of remote input/output devices, such as those that currently exist today, and is not limited to the specific type of remote input/output (and controller) device described herein. Using this technique, it is possible to physically connect the remote input/output devices anywhere within the process control system, such as to places not directly connected to the field device input/output ports of the controllers, and logically map the remote input/output devices or individual ports thereof to any of the controllers within the process control system.

If desired, the controller platform 10 may be packaged in a rugged or hazardous environment safe casing or housing and may conform to the standards required for use in a hazardous environment. In one embodiment, the controller 10 may use wireless communication hardware and software and may be sealed in a ruggedized and hazardous safe housing to protect it from shock and other harsh environments. It may also store and execute advanced control, alarming and other applications or modules that are typically associated with distributed process control systems to make for a very versatile, easy to use and to install, fully capable controller. Still further, the housing of the controller 10 may be made to accept or hold a configuration device or a user interface device to be used in the field to configure the controller 10 (when connected to the port 16) or to allow an operator to view the state or other information associated with the controller 10 (when connected to the controller 10 via one of the ports 18 or 20).

The description herein that the configuration communication port 16 is connected to the processor and to the memory means that the communications port 16 has unfettered access thereto for performing typical configuration activities. Likewise, the description herein that the processor 12 is connected directly to the input/output ports 22 means that the processor 12 can access these ports at any time and need not go through a separate multiplexer to do so.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A controller for use in controlling a plurality of devices within a process, the controller comprising:
   a processor adapted to be programmed to execute one or more programming routines;
   a memory coupled to the processor and adapted to store the one or more programming routines to be executed on the processor;
   a plurality of field device input/output ports communicatively connected to the processor; and
   a configuration communication port connected to the processor and to the memory;
   wherein the controller can operate as a stand-alone controller or as one of a plurality of controllers within a distributed process control system having a user interface with which the plurality of controllers is connected to download configuration information and to communicate further information during execution of the one or more programming routines.

2. The controller of claim 1, wherein the processor is a general purpose processor.

3. The controller of claim 1, further including a second communication port adapted to be intermittently connected to an operator interface to enable the operator interface to view information stored within the memory or the processor.

4. The controller of claim 3, wherein the second communication port is a MODBUS TCP communication port.

5. The controller of claim 4, further including a register map stored in the memory adapted to be accessed by the second communication port.

6. The controller of claim 3, wherein second communication port is a serial communication port.

7. The controller of claim 6, wherein the second communication port is an RS-485 communication port.

8. The controller of claim 3, further including a register map stored in the memory adapted to be accessed by the second communication port.

9. The controller of claim 3, wherein the second communication port is a MODBUS TCP communication port and further including a third communication port that is a serial communication port.

10. The controller of claim 1, wherein the memory includes a non-volatile portion adapted to store configuration information pertaining to the controller.

11. The controller of claim 10, wherein the non-volatile portion of the memory is adapted to store the one or more programming routines.

12. The controller of claim 1, further including the plurality of programming routines and wherein the plurality of programming routines are compatible with a distributed process control system programming paradigm.

13. The controller of claim 12, wherein the distributed process control system programming paradigm is compatible with the Fieldbus protocol.

14. The controller of claim 12, wherein the distributed process control system programming paradigm is an object oriented programming paradigm.

15. The controller of claim 1, wherein configuration communication port is adapted to be intermittently connected to a configuration device and wherein the processor is adapted to execute the one or more programming routines when the configuration communication port is not connected to the configuration device.

16. The controller of claim 1, further including the one or more programming routines and wherein the one or more programming routines includes a fuzzy logic control routine.

17. The controller of claim 1, further including the one or more programming routines and wherein the one or more programming routines includes a neural network control routine.

18. The controller of claim 1, further including the one or more programming routines and wherein the one or more programming routines includes a model predictive control routine.

19. The controller of claim 1, further including the one or more programming routines and wherein the one or more programming routines includes an adaptive tuning routine.

20. The controller of claim 1, further including the one or more programming routines and wherein the one or more programming routines includes an optimization routine.

21. The controller of claim 1, further including the one or more programming routines and wherein the one or more programming routines includes an alarming routine.

22. The controller of claim 1, further including the one or more programming routines and wherein the one or more programming routines includes a diagnostic routine.

23. The controller of claim 1, further including a wireless transmitter and receiver associated with at least one of the plurality of field device input/output ports.

24. The controller of claim 1, further including a ruggedized housing and wherein the processor and the memory are disposed within the ruggedized housing.

25. The controller of claim 24, wherein the ruggedized housing is sealed.

26. The controller of claim 24, wherein the ruggedized housing is adapted to provide a safe housing in an environmentally hazardous location.

27. The controller of claim 1, further including:
a second communication port adapted to be connected to another controller;
an input/output extension having;
a multiplexer;
a second plurality of field device input/output ports communicatively connected to the multiplexer; and
an extension communication port adapted to be intermittently connected to another controller; and
a communication link between the second communication port and the extension communication port.

28. A controller for use in controlling a plurality of devices within a process, the controller comprising:
a processor adapted to be programmed to execute one or more programming routines;
a memory coupled to the processor and adapted to store the one or more programming routines to be executed on the processor;
a configuration communication port connected to the processor and to the memory; and
a second communication port adapted to be intermittently connected to an operator interface to enable the operator interface to view information stored within the memory or the processor;
wherein the controller can operate as a stand-alone controller or as one of a plurality of controllers within a distributed process control system having a user interface with which the plurality of controllers is connected to download configuration information and to communicate further information during execution of the one or more programming routines.

29. The controller of claim 28, further including a third communication port that is a serial communication port.

30. The controller of claim 29, wherein the second communication port is a MODBUS TCP communication port.

31. The controller of claim 29, further including a register map stored in the memory adapted to be accessed by the second communication port or by the third communication port.

32. The controller of claim 29, wherein the third communication port is an RS-485 communication port.

33. The controller of claim 28, wherein the memory includes a non-volatile portion adapted to store configuration information pertaining to the controller.

34. The controller of claim 28, further including the plurality of programming routines and wherein the plurality of programming routines are compatible with a distributed process control system programming paradigm.

35. The controller of claim 34, wherein the distributed process control system programming paradigm is an object oriented programming paradigm.

36. The controller of claim 28, wherein configuration communication port is adapted to be intermittently connected to a configuration device and wherein the processor is adapted to execute the one or more programming routines when the configuration communication port is not connected to the configuration device.

37. The controller of claim 28, further including a ruggedized housing and wherein the processor and the memory are disposed within the ruggedized housing.

38. The controller of claim 37, wherein the ruggedized housing is adapted to provide a safe housing in an environmentally hazardous location.

39. A controller for use in controlling a plurality of devices within a process, the controller comprising:
a processor adapted to be programmed to execute one or more programming routines;
a non-volatile memory coupled to the processor and adapted to store the one or more programming routines to be executed on the processor;
a plurality of field device input/output ports communicatively connected to the processor;
a configuration communication port connected to the processor and to the memory; and
a second communication port adapted to be intermittently connected to an operator interface to enable the operator interface to view information stored within the memory or the processor;
wherein the controller can operate as a stand-alone controller or as one of a plurality of controllers within a distributed process control system having a user interface with which the plurality of controllers is connected to download configuration information and to communicate further information during execution of the one or more programming routines.

40. The controller of claim 39, further including a third communication port that is a serial communication port.

41. The controller of claim 40, wherein the second communication port is a MODBUS TCP communication port.

42. The controller of claim 1, wherein the controller is connected with the user interface via the configuration communication port for communication of the configuration information and the further information.

43. The controller of claim 42, wherein the distributed process control system comprises a bus connecting the plurality of controllers, and wherein the bus is connected to the controller via the configuration communication port such that the configuration information can be downloaded from the distributed process control system.

44. The controller of claim 28, wherein the controller is connected with the user interface via the configuration communication port for communication of the configuration information and the further information.

45. The controller of claim 44, wherein the distributed process control system comprises a bus connecting the plurality of controllers such that the bus is connected to the controller via the configuration communication port.

46. The controller of claim 39, wherein the controller is connected with the user interface via the configuration communication port for communication of the configuration information and the further information.

47. The controller of claim 46, wherein the distributed process control system comprises a bus connecting the plurality of controllers such that the bus is connected to the controller via the configuration communication port.

* * * * *

UNITED STATES PATENT AND TRADEMARK OFFICE
CERTIFICATE OF CORRECTION

| | | |
|---|---|---|
| PATENT NO. | : 6,973,508 B2 | |
| APPLICATION NO. | : 10/074304 | |
| DATED | : December 6, 2005 | |
| INVENTOR(S) | : Rusty Shepard et al. | |

It is certified that error appears in the above-identified patent and that said Letters Patent is hereby corrected as shown below:

At Column 2, line 23, please delete "programed" and insert --programmed--
At Column 4, line 8, please delete "programable" and insert --programmable--
At Column 4, line 23, please delete "a least" and insert --at least--
At Column 6, line 13, please insert --be-- immediately before "integrated"
At Column 9, line 15, please delete "use" and insert --uses--
At Column 11, line 42, please delete "with used" and insert --be used--

In Claim 15, Column 13, line 9, please insert --the-- immediately before "configuration"

Signed and Sealed this

Twenty-ninth Day of May, 2007

JON W. DUDAS
*Director of the United States Patent and Trademark Office*